United States Patent
Liu et al.

(12) United States Patent (10) Patent No.: US 6,846,542 B1
(45) Date of Patent: Jan. 25, 2005

(54) UV TREATMENT FOR IMPROVING PERFORMANCE OF LUBRICATED THIN FILM RECORDING MEDIA AND MEDIA OBTAINED THEREBY

(75) Inventors: Jianwei Liu, Fremont, CA (US); Michael Joseph Stirniman, Fremont, CA (US); Jing Gui, Fremont, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 10/326,155

(22) Filed: Dec. 23, 2002

Related U.S. Application Data
(60) Provisional application No. 60/415,160, filed on Sep. 30, 2002.

(51) Int. Cl.[7] .................................................. G11B 5/725
(52) U.S. Cl. ...................... 428/64.2; 428/65.8; 428/421; 428/694 TF; 427/130; 427/553
(58) Field of Search ................................ 428/64.2, 65.8, 428/421, 694 TF; 427/130, 553

(56) References Cited

U.S. PATENT DOCUMENTS

| | | |
|---|---|---|
| 2,564,646 A | 8/1951 | Leistner et al. |
| 2,997,454 A | 8/1961 | Leistner et al. |
| 3,039,993 A | 6/1962 | Friedman et al. |
| 3,047,608 A | 7/1962 | Friedman et al. |
| 3,053,878 A | 9/1962 | Friedman et al. |
| 3,516,963 A | 6/1970 | Friedman et al. |
| 3,558,554 A | 1/1971 | Kuriyama et al. |
| 4,187,212 A | 2/1980 | Zinke et al. |
| 4,233,207 A | 11/1980 | Spivack |
| 4,282,141 A | 8/1981 | Minagawa et al. |
| 4,526,918 A | 7/1985 | Burton |
| 4,701,375 A * | 10/1987 | Nishimatsu et al. ........ 428/336 |
| 5,077,424 A | 12/1991 | Hanayama et al. |
| 5,376,465 A | 12/1994 | Saibara et al. |
| 5,385,961 A | 1/1995 | Avakian et al. |
| 5,399,276 A | 3/1995 | Benjamin et al. |
| 5,453,539 A | 9/1995 | Kondo et al. |
| 5,480,694 A | 1/1996 | Daimon et al. |
| 5,489,480 A * | 2/1996 | Usuki et al. ................ 428/421 |
| 5,587,217 A | 12/1996 | Chao et al. |
| 5,674,927 A | 10/1997 | Mahood |
| 5,718,942 A | 2/1998 | Vurens et al. |
| 5,874,169 A * | 2/1999 | Falcone ...................... 428/421 |
| 5,908,817 A | 6/1999 | Perettie et al. |
| 5,922,415 A | 7/1999 | Dearnaley et al. |
| 6,001,446 A | 12/1999 | Nakada et al. |
| 6,294,627 B1 | 9/2001 | Worm et al. |

OTHER PUBLICATIONS

Crompton Product Documents, www.uniroyalchemical-.com/servlet.ContentServer?pagenam . . . , pp. 4.
Antioxidants Product Information, www.cromptoncorp-.com, pp. 4.

* cited by examiner

*Primary Examiner*—Stevan A. Resan
(74) *Attorney, Agent, or Firm*—McDermott Will & Emery LLP (57) ABSTRACT

A method of increasing the performance of a composite lubricant material when utilized as a thin film lubricant, comprising:
(a) providing a substrate including a surface;
(b) providing a composite lubricant comprising a mixture of at least one perfluoropolyether compound and at least one phosphite or phosphate compound;
(c) applying a thin layer of the composite lubricant to the substrate surface; and
(d) treating the thin layer of composite lubricant with UV radiation at a dosage and for an interval sufficient to reduce the surface tension, increase the corrosion resistance, increase the durability and reduce the stiction/friction of the thin layer of composite lubricant.

21 Claims, 2 Drawing Sheets

UV TREATMENT FOR IMPROVING PERFORMANCE OF LUBRICATED THIN FILM RECORDING MEDIA AND MEDIA OBTAINED THEREBY

CROSS-REFERENCE TO PROVISIONAL APPLICATION

This application claims priority from U.S. provisional patent application Ser. No. 60/415,160 filed Sep. 30, 2002, the entire disclosure of which is incorporated herein by reference.

CROSS REFERENCE TO RELATED APPLICATION

This application discloses subject matter related to subject matter disclosed in co-pending, commonly assigned U.S. patent application Ser. No. 10/326,095 filed Dec. 23, 2002.

FIELD OF THE INVENTION

The present invention relates to polymeric lubricants having improved chemical stability, and to thin film data/information storage and retrieval media comprising thin films of same as a lubricant topcoat for reducing static and dynamic frictional coefficients of the media when utilized in combination with a flying head read/write transducer. The invention enjoys particular utility in the manufacture and use of thin film type magnetic or magneto-optical ("MO") recording media comprising a stacked plurality of thin film layers formed on a substrate, e.g., a disk-shaped substrate, wherein a thin topcoat layer comprised of a polymeric lubricant is applied to the upper surface of the layer stack for improving tribological performance of the media when utilized with read/write transducer heads operating at very low flying heights.

BACKGROUND OF THE INVENTION

Magnetic and MO media are widely employed in various applications, particularly in the computer industry for data/information storage and retrieval purposes. A magnetic medium in, e.g., disk form, such as utilized in computer-related applications, comprises a non-magnetic disk-shaped substrate, e.g., of glass, ceramic, glass-ceramic composite, polymer, metal, or metal alloy, typically an aluminum (Al)-based alloy such as aluminum-magnesium (Al—Mg), having at least one major surface on which a layer stack or laminate comprising a plurality of thin film layers constituting the medium are sequentially deposited. Such layers may include, in sequence from the substrate deposition surface, a plating layer, e.g., of amorphous nickel-phosphorus (Ni-P), a polycrystalline underlayer, typically of chromium (Cr) or a Cr-based alloy such as chromium-vanadium (Cr—V), a magnetic layer, e.g., of a cobalt (Co)-based alloy, and a protective overcoat layer, typically of a carbon (C)-based material, e.g., diamond-like carbon ("DLC") having good tribological properties. A similar situation exists with MO media, wherein a layer stack or laminate is formed on a substrate deposition surface, which layer stack or laminate typically comprises a reflective layer, e.g., of a metal or metal alloy, one or more rare-earth thermo-magnetic (RE-TM) alloy layers, one or more transparent dielectric layers, and a protective overcoat layer, e.g., a DLC layer, for functioning as reflective, transparent, writing, writing assist, and read-out layers, etc.

Thin film magnetic and MO media in disk form, such as described supra, are typically lubricated with a thin topcoat film or layer comprised of a polymeric lubricant, e.g., a perfluoropolyether, to reduce wear of the disc when utilized with data/information recording and read-out transducer heads operating at low flying heights, as in a hard disk system functioning in a contact Start/Stop ("CSS") mode. Conventionally, the thin film of lubricant is applied to the disc surface(s) during manufacture by dipping into a bath containing a small amount of lubricant, e.g., less than about 1% by weight of a fluorine-containing polymer, dissolved in a suitable solvent, typically a perfluorocarbon, fluorohydrocarbon, or hydrofluoroether.

Thin film magnetic recording media are conventionally employed in disk form for use with disk drives for storing large amounts of data in magnetizable form. Typically, one or more disks are rotated on a central axis in combination with data transducer heads. In operation, a typical contact start/stop ("CSS") cycle commences when the head begins to slide against the surface of the disk as the disk begins to rotate. Upon reaching a predetermined high rotational speed, the head floats in air at a predetermined distance from the surface of the disk due to dynamic pressure effects caused by the air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions, allowing data to be recorded on and retrieved from the disk at a desired position. Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerated from the static position, and during deceleration just prior to completely stopping. Each time the head and disk assembly is driven, the sliding surface of the head repeats the cyclic sequence consisting of stopping, sliding against the surface of the disk, floating in air, sliding against the surface of the disk, and stopping.

For optimum consistency and predictability, it is necessary to maintain each transducer head as close to its associated recording surface as possible, i.e., in order to minimize the flying height of the head. Accordingly, a smooth recording surface is preferred, as well as a smooth opposing surface of the associated transducer head. However, if the head surface and the recording surface are too flat, the precision match of these surfaces gives rise to excessive stiction and friction during the start up and stopping phases, thereby causing wear to the head and recording surfaces, eventually leading to what is referred to as a "head crash." Thus, there are competing goals of reduced head/disk friction and minimum transducer flying height.

The lubricity properties of disk-shaped recording media are generally measured and characterized in terms of dynamic and/or static coefficients of friction. The former type, i.e., dynamic friction coefficient, is typically measured utilizing a standard drag test in which the drag produced by contact of a read/write transducer head with a disk surface is determined at a constant spin rate, e.g., 1 rpm. The latter type, i.e., static coefficients of friction (also known as "stiction" values), are typically measured utilizing a standard contact start/stop ("CSS") test in which the peak level of friction is measured as the disk starts rotating from zero (0) rpm to a selected revolution rate, e.g., 7,200 rpm. After the peak friction has been measured, the disk is brought to rest, and the start/stop process is repeated for a selected number of start/stop cycles. An important property of a disk which is required for good long-term disk and drive performance is that the disk retain a relatively low coefficient of friction after many start/stop cycles or contacts with the read/write transducer head, e.g., 20,000 start/stop cycles.

According to conventional practices, a lubricant topcoat is uniformly applied over the protective overcoat layer to prevent wear between the disk and the facing surface of the read/write transducer head during CSS operation because excessive wear of the protective overcoat layer increases friction between the transducer head and the disk, eventually leading to catastrophic failure of the disk drive. However, an excess amount of lubricant at the head-disk interface causes high stiction between the head and the disk, which stiction, if excessive, prevents starting of disk rotation, hence catastrophic failure of the disk drive. Accordingly, the lubricant thickness must be optimized for stiction and friction.

The continuing requirements for increased recording density and faster data transfer rates necessitating lower flying heights of the data transducing heads and friction/stiction of the head-disk interface have served as an impetus for the development of specialized lubricants for serving as the lubricant topcoat layer overlying the protective overcoat layer. Such lubricants are required to fulfill a variety of functions requiring diverse characteristics and attributes. For example, the lubricant material forming the topcoat layer must be chemically inert, have a low vapor pressure, low surface tension, high thermal stability, mechanical stability under shear stress, and good boundary lubrication properties. In addition to the foregoing, it is critical that the lubricant adhere tightly to the underlying surface, i.e., the protective overcoat layer (typically carbon-based) over the lifetime of the disk drive comprising the recording disk and associated flying head data transducer.

Fluoropolyether lubricants have been developed which are in widespread use as materials for forming the lubricant topcoat layers of disk-shaped data/information storage and retrieval media, e.g., magnetic and MO recording media. Fluoropolyether-based lubricants are uniquely suited for use as lubricant topcoat layers in such rotating disk-type recording media in view of their exemplary properties, including inter alia, chemical inertness, low vapor pressure, low surface tension, high thermal stability, mechanical stability under high shear stress, and good boundary lubrication properties. Among the many currently available fluoropolyether lubricants, liquid perfluoropolyethers (PFPE) and derivatives thereof are most commonly employed in forming lubricant topcoat layers on rotatable recording media.

Commercially available PFPE lubricants include KRYTOX™ (DuPont Co., Wilmington, Del.); FOMBLIN™ Z-DOL, Z-TETRAOL, Z-DOL TXS, AM 2001, and AM 3001 (Ausimont Montedison Group, Thorofare, N.J.); and DEMNUM™ SA, SH, SP, and SY (Daikin Industries, Ltd., Osaka, Japan). A number of these commercially available PFPE-based lubricants are substituted with 2 to 4 polar end-groups, such as 2–4 hydroxyl or carboxyl groups, which polar end-groups are provided for enhancing adhesion of the polymeric lubricant molecules to the surface of the recording media, e.g., the surface of a carbon-based protective overcoat layer. Application of the PFPE-based lubricants to the media surface may be performed by any standard technique, e.g., dipping, spraying, spin coating, etc., followed by drying to remove any volatile solvent(s) therefrom, and if desired, followed by tape burnishing. A more recently developed technique for applying thin films of polymeric lubricants to media surfaces comprises generation of a vapor of the lubricant followed by condensation of the vapor on the media surface.

As indicated above, conventional PFPE-based lubricants generally comprise 2–4 polar groups or moieties at either end of a generally linear perfluorinated alkylpolyether molecule, for facilitating direct bonding to a surface, and thus, provide improved adhesion of the lubricant topcoat layer to the surface of the protective overcoat layer. Such polar functional groups, however, are not necessarily chemically inert, i.e., they may exhibit varying degrees of chemical inertness, and consequently, the above-described conventional PFPE-based lubricants may disadvantageously undergo chemical reactions prior or subsequent to their application to the media surface. In particular, contamination of the lubricant topcoat layer with a Lewis acid, e.g., aluminum oxide ($Al_2O_3$), may promote rapid degradation of the lubricant topcoat layer.

As a consequence of such concerns and problems associated with the chemical stability of derivatized PFPE lubricant materials utilized as topcoat layers in rotatable disk recording media, decomposition resistance of the lubricant is an important criterion in lubricant selection, particularly resistance against acid-catalyzed decomposition.

An approach for improving the performance of the most commonly employed lubricants utilized with thin film, disk-shaped magnetic and MO media, i.e., perfluoropolyether ("PFPE")-based lubricants, which lubricants perform well under ambient conditions but not under conditions of higher temperature and high or low humidity, is described in, for example, U.S. Pat. No. 5,587,217, the entire disclosure of which is incorporated herein by reference, wherein it is disclosed that studies indicate that the tribological properties, and perhaps corrosion resistance, of perfluoropolyether-based lubricants utilized in the manufacture of thin film recording media can be substantially improved by addition thereto of an appropriate amount of a cyclotriphosphazene-based lubricant additive, e.g., a polyphenoxy cyclotriphosphazene comprising substituted or unsubstituted phenoxy groups, to form what is termed a "composite lubricant".

Currently, bis (4-fluorophenoxy)-tetrakis (3-trifluoromethyl phenoxy) cyclotriphosphazene (available as X-1P™ from Dow Chemical Co., Midland, Mich.) is the additive most commonly utilized with perfluoropolyether-based lubricants for forming composite lubricants for use with thin film magnetic and MO media. However, as disclosed in U.S. Pat. Nos. 5,718,942 and 5,908,817, the disclosures of which are incorporated herein by reference, the use of X-1P as a lubricant additive for forming composite lubricants comprising the perfluoropolyether-based lubricants commonly employed in the data storage industry (e.g., Fomblin Z-DOL™ and Fomblin Z-TETRAOL™, each available from Ausimont, Thorofare, N.J.) incurs a disadvantage in that the former (i.e., the cyclotriphosphazene-based lubricant additive) has very low solubility in the latter (i.e., the PFPE-based primary lubricant), resulting in phase separation and droplet formation.

Another approach for improving the performance of the most commonly employed lubricants utilized with thin film, disk-shaped magnetic and MO media, i.e., perfluoropolyether ("PFPE")-based lubricants is the addition of phosphate and/or phosphite antioxidant/stabilizer materials to solutions of the PFPE-based lubricants. However, while such additions have been found to be very effective in retarding chemical degradation of the PFPE-based lubricant thin films, the addition of such antioxidant/stabilizer materials incurs a number of problems, including phase separation, hazing, and poor tribological performance, especially with ultra-thin lubricant films.

Thus, a significant factor in evaluating the performance of candidate lubricant materials for use as lubricant topcoat layers in rotatable recording media is the ability of the lubricant to resist chemical decomposition over time, particularly acid-catalyzed decomposition, while not deleteriously affecting critical or requisite lubricant properties. In view of the criticality of the lubricant topcoat in obtaining and maintaining optimum performance of rotating disk recording media utilized with flying head read/write transducers operating at very low flying heights, there is a continuing need for lubricant materials and topcoat layers exhibiting improved chemical and physical durability, corrosion resistance, adhesion, stiction and wear performance, etc., particularly under conditions of high stress, temperature, and humidity.

DISCLOSURE OF THE INVENTION

An advantage of the present invention is an improved method for increasing the performance of a data/information storage and retrieval medium when utilized in Contact Start/Stop ("CSS") operation.

Another advantage of the present invention is an improved method for increasing the performance of a disk-shaped magnetic or magneto-optical ("MO") recording medium when utilized in Contact Start/Stop ("CSS") operation.

Yet another advantage of the present invention is a data/information storage and retrieval medium exhibiting improved performance when utilized in Contact Start/Stop ("CSS") operation.

Still another advantage of the present invention is a disk-shaped magnetic or magneto-optical ("MO") recording medium exhibiting improved performance when utilized in Contact Start/Stop ("CSS") operation.

Additional advantages and other aspects and features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a method of increasing the performance of a composite lubricant material when utilized as a thin film lubricant, which method comprises steps of:

(a) providing a substrate including at least one surface;

(b) providing a composite lubricant comprising a mixture of at least one perfluoropolyether compound and at least one phosphite or phosphate compound;

(c) applying a thin layer or film of the composite lubricant to the at least one surface of the substrate; and (d) treating the thin layer or film of composite lubricant with UV radiation at a dosage and for an interval sufficient to:

(i) reduce the surface tension of the thin layer or film of composite lubricant, as evidenced by an increase in the water contact angle ("WCA") thereof;

(ii) increase the corrosion resistance of the thin layer or film of composite lubricant; and (iii) increase durability and reduce stiction/friction of the thin layer or film of composite lubricant.

According to embodiments of the present invention, step (a) comprises providing a substrate in the form of a disk-shaped magnetic or magneto-optical ("MO") recording medium, wherein the at least one surface comprises a layer of a carbon (C)-based material; step (b) comprises providing a composite lubricant comprising a 50/50 mixture of at least one perfluoropolyether compound and at least one phosphite compound, wherein the mixture comprises at least one perfluoropolyether compound having a generally linear perfluoropolyether chain with a reactive group at at least one end of the chain, and at least one organophosphite or organophosphate compound comprised of at least one aromatic group bonded to a phosphorus atom via an oxygen atom.

Preferred embodiments of the invention include those wherein step (b) comprises providing a composite lubricant in the form of a 50/50 mixture of the at least one perfluoropolyether compound and the at least one organophosphite or organophosphate compound; the at least one perfluoropolyether compound has a generally linear perfluoropolyether chain comprising a plurality of —$(C_xF_{2x}O)_n$- repeating units, wherein x in each unit is independently an integer from about 1 to about 10, n is an integer from about 10 to about 30, and the at least one reactive group at at least one end of the generally linear chain is selected from the group consisting of ester (—COOR), alcohol (—COH), carboxylic acid (—COOH), and carboxylic chloride (—COCl) groups; and the at least one organophosphite or organophosphate compound is comprised of at least one substituted aromatic group, i.e., the at least one organophosphite compound is preferably selected from the group consisting of tris (2,4 di-butylphenoxy) phosphite, tris (mono-fluorophenoxy) phosphite, and tris (mono-trifluoromethylphenoxy) phosphite and the at least one organophosphate compound is preferably selected from the group consisting of tris (2,4 di-butylphenoxy) phosphate, tris (mono-fluorophenoxy) phosphate, and tris (mono-trifluoromethylphenoxy) phosphate.

Further preferred embodiments of the invention include those wherein step (c) comprises applying the thin layer or film of the composite lubricant at a thickness ranging from about 5 to about 40 Å; and step (d) comprises treating the thin layer or film of the composite lubricant with UV radiation from a source including wavelengths of 185 and 254 nm and providing an intensity between about 20 and about 35 mw/cm$^2$ in an oxygen-free atmosphere for from about 20 sec. to about 2 min. at about 50° C.

Another aspect of the present invention is a data/information storage and retrieval medium with improved durability when utilized in "Contact Start/Stop" ("CSS") operation, comprising:

(a) a disk-shaped substrate including at least one surface, a layer stack formed on the at least one surface and including at least one magnetic or magneto-optical ("MO") recording layer and an uppermost, protective overcoat layer comprising a carbon (C)-based material; and (b) a lubricant topcoat layer on the protective overcoat layer, the lubricant topcoat layer formed by a process comprising steps of:

(i) applying a thin layer or film of a composite lubricant material on the protective overcoat layer, the composite lubricant comprising a mixture of at least one perfluoropolyether compound and at least one phosphite or phosphate compound; and (ii) treating the thin layer or film of composite lubricant with UV radiation at a dosage and for an interval sufficient to:

(1) reduce the surface tension of the thin layer or film of composite lubricant, as evidenced by an increase in the water contact angle ("WCA") thereof;

(2) increase the corrosion resistance of the thin layer or film of composite lubricant; and (3) increase durability and reduce stiction/friction of the thin layer or film of composite lubricant.

According to embodiments of the present invention, the composite lubricant comprises a mixture of at least one perfluoropolyether compound having a generally linear perfluoropolyether chain with a reactive group at at least one end of the chain; and at least one organophosphite or organophosphate compound comprised of at least one aromatic group bonded to a phosphorus atom via an oxygen atom.

Preferred embodiments of the invention include those wherein the lubricant topcoat layer has a thickness ranging from about 5 to about 40 Å and the lubricant mixture comprises at least one perfluoropolyether compound having a generally linear perfluoropolyether chain with a reactive group at at least one end of a chain comprised of a plurality of —$(C_xF_{2x}O)_n$-repeating units, wherein x in each unit is independently an integer from about 1 to about 10 and n is an integer from about 10 to about 30, and the at least one reactive group at at least one end of the generally linear chain is selected from the group consisting of ester (—COOR), alcohol (—COH), carboxylic acid (—COOH), and carboxylic chloride (—COCl) groups; and the mixture includes at least one organophosphite compound including at least one substituted aromatic group, selected from the group consisting of tris (2,4 di-butylphenoxy) phosphite, tris (mono-fluorophenoxy) phosphite, and tris (mono-trifluoromethylphenoxy) phosphite, or the mixture includes at least one organophosphate compound including at least one substituted aromatic group, selected from the group consisting of tris (2,4 di-butylphenoxy) phosphate, tris (mono-fluorophenoxy) phosphate, and tris (mono-trifluoromethylphenoxy) phosphate.

Additional advantages and aspects of the present invention will become readily apparent to those skilled in the art from the following detailed description, wherein embodiments of the present invention are shown and described, simply by illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, wherein.

DESCRIPTION OF THE INVENTION

The present invention is based upon recognition that the above-described limitations and drawbacks associated with the use of composite lubricant compositions including at least one PFPE primary lubricant material and at least one phosphite or phosphate-based lubricant additive in applying and forming lubricant topcoats in the manufacture of thin film magnetic and/or MO recording media, e.g., hard disks operated according to a CSS regime, can be substantially avoided, or at least minimized, by performing an in situ performance enhancement process, e.g., durability enhancement under CSS operating conditions, wherein a thin film of the composite lubricant applied (in a conventional manner) to the surface of a recording medium comprised of a laminate or stack of thin film layers is treated with UV radiation at a dosage selected for enhancing, i.e., increasing the tribological performance and durability under CSS operating conditions.

The inventive methodology, wherein a thin layer or film of a composite lubricant comprising a mixture of at least one perfluoropolyether-based lubricant and at least one phosphite or phosphate antioxidant/stabilizer compound is applied to a media surface and then treated with UV radiation of appropriate wavelengths at sufficient dosage and interval for improving the tribological and corrosion-resistance properties thereof, advantageously overcomes the difficulties, drawbacks, and disadvantages typically associated with the use of lubricant +additive mixtures, including inter alia, phase separation, hazing, and degraded triboligical performance, particularly when the lubricant layer is ultra-thin. Moreover, the perfluoropolyether-based lubricant materials and the phosphite or phosphate antioxidant/stabilizer compounds utilized according to the present invention are commercially available or easily synthesized from readily available precursor materials. In addition, the composite lubricants comprising mixtures of perfluoropolyether-based lubricants and phosphite or phosphate antioxidant/stabilizer compounds according to the present invention are conveniently applied as thin lubricant topcoat layers of thin film magnetic and/or MO recording media by means of conventional techniques and methodologies, e.g., as by dipping the media surface into a solution of the mixture in a suitable solvent, and the UV-treated lubricant films or layers derived therefrom exhibit substantially increased resistance to catalyzed decomposition and friction, stiction, and tribological performance characteristics generally superior to those of conventional perfluoropolyether-based lubricant materials.

According to the present invention, therefore, tribological performance and stability of linear chain perfluoropolyether-based lubricants utilized in the manufacture and use of thin film magnetic and/or MO recording media in disk form, particularly against catalyzed decomposition reactions, is significantly improved by: (1) admixture therewith of at least one phosphite or phosphate antioxidant/stabilizer compound, i.e., at least one organophosphite or organophosphate compound, to form a composite lubricant; and (2) subsequent UV treatment of a thin film or layer of the composite lubricant.

As utilized herein and elsewhere (see, e.g., U.S. Pat. Nos. 3,039,993; 3,047,608; 3,558,554; 4,187,212; 4,282,141; 5,077,424; 5,385,961; and 5,674,927, the entire disclosures of which are incorporated herein by reference thereto), organophosphite compounds exhibiting antioxidant/stabilizer activity comprise, in their simplest form, tertiary phosphites including a central phosphorous (P) atom with three surrounding oxygen (O) atoms each bonded to an organic group (R), i.e., (R—O)$_3$—P, wherein the three R groups may be the same or different, and organophosphate compounds exhibiting antioxidant/stabilizer activity comprise, in their simplest form, tertiary phosphates including a central phosphorous (P) atom with three surrounding oxygen (O) atoms each bonded to an organic group R, and a fourth oxygen atom doubly bonded to the central phosphorous atom, i.e., (R—O)₃—P=O, wherein the three R groups may be the same or different.

Suitable organophosphite antioxidant/stabilizer compounds for use in the present invention typically, but not exclusively, include identical R groups, and frequently comprise an aromatic R group or moiety, e.g., a phenyl group, and therefore organophosphite compounds containing phenyl groups and alkylphenyl groups such as methylphenyls, ethylphenyls, and tert-butyl phenyls are usable according to the invention. Organophosphite antioxidant/stabilizer compounds containing fluorine-substituted phenyls, e.g., fluorophenyls and trifluoromethylphenyls, are also usable and advantageous according to the invention in view of the reduction in surface energy, hence increased water contact angles ("WCA") they afford.

Similarly, suitable organophosphate antioxidant/stabilizer compounds for use in the present invention typically, but not exclusively, include identical R groups, and frequently comprise an aromatic R group or moiety, e.g., a phenyl group, and therefore organophosphate compounds containing phenyl groups and alkylphenyl groups such as methylphenyls, ethylphenyls, and tert-butyl phenyls are usable according to the invention. Again, organophosphate antioxidant/stabilizer compounds containing fluorine-substituted phenyls, e.g., fluorophenyls and trifluoromethylphenyls, are advantageous according to the invention in view of the reduction in surface energy, hence increased water contact angles ("WCA") they afford.

By way of illustration, but not limitation, examples of suitable organophosphite antioxidant/stabilizer compounds for use in the present invention include:

tris (2,4 di-butylphenoxy) phosphite ("TBPP")

tris (mono-fluorophenoxy) phosphite and tris (mono-trifluoromethylphenoxy) phosphite Of these, TBPP is commercially available from Sigma-Aldrich, Milwaukee, Wis. and the fluorophenoxy phosphite antioxidant/stabilizer compounds may be readily synthesized by reaction of fluoro phenol or trifluoromethyl phenol with phosphorous trichloride (PCl₃) in a suitable solvent, e.g., triethylamine (Et₃N), as follows:

Also by way of illustration, but not limitation, examples of suitable organophosphate antioxidant/stabilizer compounds for use in the present invention include:

tris (2,4 di-butylphenoxy) phosphate tris (mono-fluorophenoxy) phosphate and tris (mono-trifluoromethylphenoxy) phosphate Generally linear perfluoropolyether compounds, usable as precursor compounds according to the invention, comprise a plurality of —(C$_x$F$_{2x}$O)$_n$- repeating units, wherein x in each unit is independently an integer from 1 to about 10 and n is an integer from about 10 to about 30, with at least one reactive group selected from ester (—COOR), alcohol (—COH), carboxylic acid (—COOH), and carboxylic chloride (—COCl) groups at at least one end of the chain. Several such precursor compounds including these reactive end groups and suitable for use according to the invention are available from Ausimont Montedison Group, Thorofare, N.J., and include Z-Deal (with —COOR end groups), Z-Dol (with —COH groups), and Z-Diac (with —COOH end groups). The perfluoropolyether derivatives with carboxylic chloride (—COCl) end groups for use as precursor compounds according to the present invention are readily prepared from Z-Diac according to conventional synthetic practices.

While not desirous of being bound by any particular theory, it is nonetheless believed that, according to the invention, phosphite-derivatized perfluoropolyether or phosphate-derivatized perfluoropolyether lubricant materials are photolytically synthesized in situ from the composite lubricant thin films or layers formed on carbon (C)-containing protective overcoat layers of magnetic and MO recording media by effecting reaction between the reactive end groups of the linear perfluoropolyether compound and the phosphite or phosphate antioxidant/stabilizer compound(s), inasmuch as it is known that UV irradiation can excite and eject outer orbital electrons of carbon atoms (of the protective overcoat layer) as photoelectrons (see, e.g., G. H. Vurens et al., *IEEE Trans. Magnetics,* 29 (1) 282 (1993)). The photoelectrons can, in turn, initiate a series of chemical reactions between the perfluoropolyether lubricant molecules and the stabilizer/antioxidant additive compounds to provide derivatized perfluoropolyether compounds affording better compatibility between the primary lubricant molecules and the additive(s).

By way of illustration, but not limitation, the aforementioned tris-phenoxy phosphite and tris-phenoxy phosphate antioxidant/stabilizer compounds may be photolytically reacted in situ by dipping disks into a Vertrel solution of containing the aforementioned phosphite or phosphate and Z-Dol, and irradiating with UV for about 20 to 120 sec. at 50° C., the reaction represented as follows:

where n=1 or 2 and X=for example, tert-butyl, fluoro, or trifluoromethyl group(s).

Thus, it is believed that the central phosphorus (P) atom of the phosphite or phosphate antioxidant/stabilizer compounds is photolytically bonded, via an —O— linkage, to the ends of 1 or 2 linear perfluoropolyether compounds, and each end of the 1 or 2 linear perfluoropolyether compounds may be bonded to a phosphite or phosphate antioxidant/stabilizer moiety. While again not wishing to be bound by any particular theory, it is nonetheless believed that the presence of the phosphite moiety within the derivatized perfluoropolyether-based lubricant material reduces the formation and concentration of free radicals over an extended interval. It is further believed that the phosphite moiety has a greater antioxidation capability than the phosphate moiety, and therefore, while the perfluoropolyether main chain provides good stability, lubricity and tribological properties, the phosphite moiety can provide an even better defense against catalyzed decomposition than is possible with the phosphate moiety, thereby effectively stabilizing both the lubricant and the carbon-based protective overcoat and minimizing the likelihood of head crashing.

Thin films of the composite lubricant, e.g., from about 5 to about 16 Å thick, comprised of a mixture of at least one perfluoropolyether compound and at least one organophosphite or organophosphate compound can, according to the invention, be applied to the upper surface of thin film magnetic and/or MO recording media, typically in disk form and comprising an uppermost C-based protective overcoat layer, by any conventional technique, e.g., submerging the disk in a solution comprising the mixture in a suitable solvent, withdrawing the disk from the solution, and evaporating the solvent therefrom to form a thin film or layer of the composite lubricant on the surface of the protective overcoat layer.

According to the invention, the radiation source is selected to provide UV photons principally of energies below the threshold energy for production of ozone ($O_3$) from oxygen ($O_2$), i.e., wavelengths > about 185 nm, principally (i.e., at least about 70%) at about 254 nm, as by use of a low pressure Hg source. For maximum utility or productivity in continuous production processing, the source should preferably have an intensity sufficient to complete irradiation of the composite lubricant film with the pre-selected dosage in a minimum interval for a given amount of lubricant additive in the composite lubricant film, e.g., about 20 sec. to about 2 min. for UV irradiation intensities ranging from about 20 to about 35 mw/cm$^2$. UV irradiation dosage for achieving durability enhancement in a particular application is determined on the basis of the particular carbon (C)-based overcoat of the media, the lubricant layer thickness, and the additive content in the composite film.

In order to further prevent or inhibit photolytic generation of $O_3$ in the vicinity of the composite lubricant film during UV irradiation thereof, the irradiation process is preferably performed within a chamber from which $O_2$ has been purged, as by flowing an inert gas (e.g., nitrogen, $N_2$) therethrough during irradiation.

EXAMPLE

Magnetic recording disks including an about 25 Å thick protective overcoat layer of dual-layer sputtered carbon were coated, in conventional fashion, with about 16 Å thick layers of a composite lubricant material comprised of 50% Zdol and 50% tris (mono-fluorophenyl) phosphate (by wt.). UV-treated disks were subjected to pre-selected irradiation dosages from a low pressure Hg discharge source emitting radiation at about 185 and 254 nm, principally at 254 mm, and at an intensity of about 35 mw/cm$^2$ for irradiation intervals ranging from about 20 sec. to about 2 min.

Figure 1:
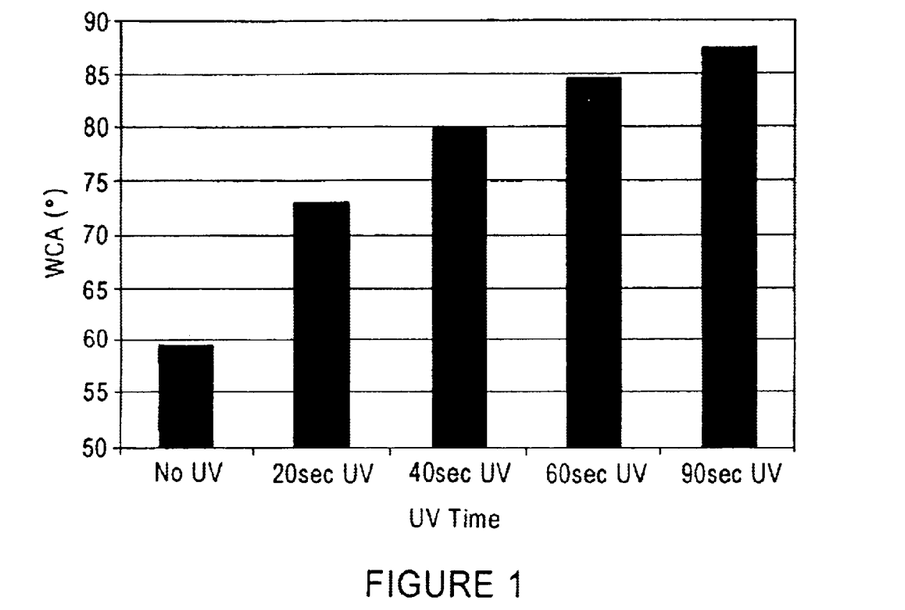
FIGS. 1–3 are bar graphs for illustrating the improvement in water contact angle (WCA), corrosion resistance, and CSS stiction/friction, respectively, of disk-shaped, thin film magnetic recording media provided by treatment of composite lubricant films according to the present invention, relative to similar media with untreated composite lubricant films.
Figure 2:
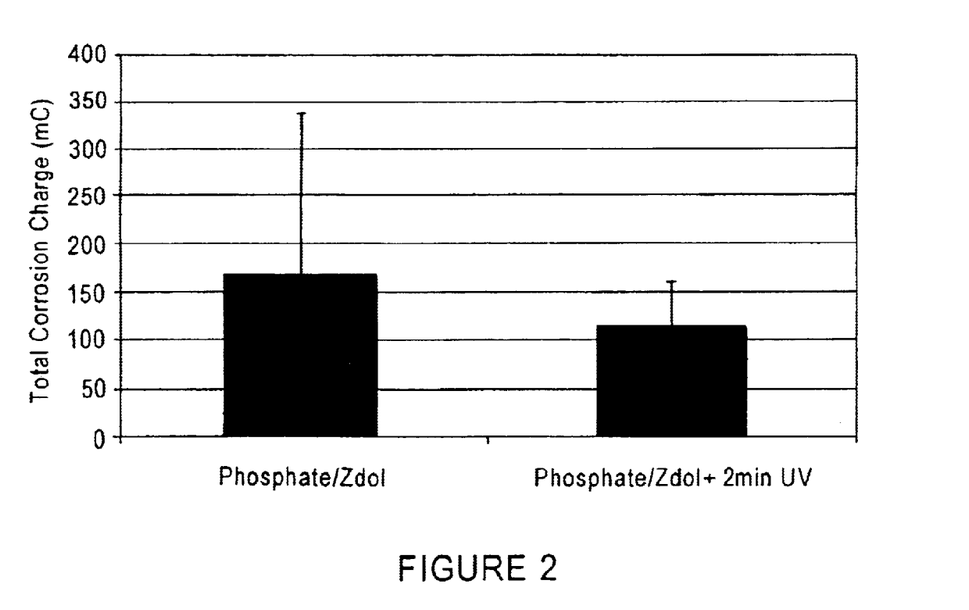
Figure 3:
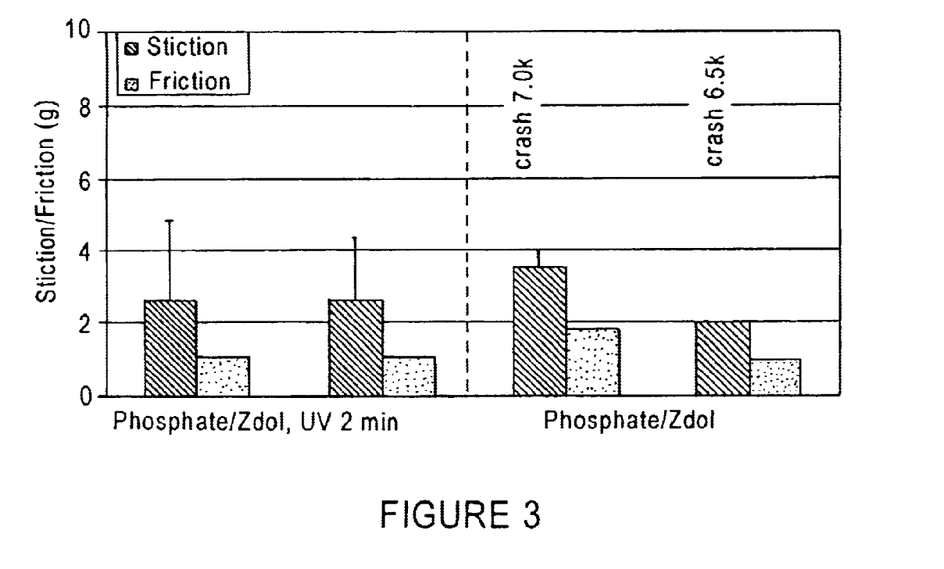

Referring to FIGS. 1–3, shown therein are bar graphs for illustrating the improvement in water contact angles (WCA), corrosion resistance, and stiction/friction (including durability under CSS operation) of disk-shaped, thin film magnetic recording media provided by pre-selected UV irradiation dosage treatment of the above-described composite lubricant films according to the above-described UV irradiation parameters, relative to similarly prepared thin film magnetic recording media with untreated composite lubricant films.

As is clearly evident from FIG. 1, which is a bar graph illustrating the variation of the WCA of the 50/50 Zdol/tris (mono-fluorophenyl) phosphate composite lubricant films with UV irradiation interval, a continuous and substantial increase in water contact angle (WCA), indicative of a reduction in surface tension or energy of the composite lubricant films, hence improved stability against chemical reaction, corrosion, etc., is observed upon UV irradiation of the films for at least about 20 sec. FIG. 2, which is a bar graph for illustrating the effect of UV irradiation on corrosion resistance (as measured by the Total Corrosion Charge (mC) of the 50/50 Zdol/tris (mono-fluorophenoxy) phosphate composite lubricant films, confirms the increased corrosion resistance of UV-treated films predicted by the increase in WCA. Finally, FIG. 3, which is a bar graph for illustrating the effect of UV irradiation on stiction/friction and crash resistance upon CSS operation, indicates that UV irradiation of the 50/50 Zdol/tris (mono-fluorophenoxy) phosphate composite lubricant films can result in reduced stiction/friction as well as increased durability under CSS operation, in that each of the untreated samples (but not the UV-treated samples) crashed at about 6.5–7.5 k CSS cycles, well under the typical 20 k CSS cycle performance requirement.

The present invention thus provides a number of advantages over conventional methodology utilizing composite lubricant films, including the formation of more durable, tribologically robust, composite lubricant films containing a perfluoropolyether primary lubricant in admixture with an organophosphite or organophosphate antioxidant/stabilizer compound, than are obtainable according to the conventional art, and is of particular utility in automated manufacturing processing of disk-shaped, carbon-overcoated, thin film magnetic and MO recording media requiring formation of stable lubricant topcoat layers for facilitating use under CSS-type operating conditions. Specifically, the present invention provides for enhanced durability lubricant films comprised of at least one PFPE primary lubricant and at least one organophosphite or organophosphate antioxidant/stabilizer moiety. Further, the inventive methodology can be readily practiced and utilized as part of conventional recording media manufacturing technology in view of its full compatibility with all other aspects of automated manufacture of disk-shaped magnetic and MO media. Finally, the inventive methodology is broadly applicable to the manufacture of a number of different products, e.g., mechanical parts, gears, linkages, etc., requiring lubrication.

In the previous description, numerous specific details are set forth, such as specific materials, structures, processes, etc., in order to provide a better understanding of the present invention. However, the present invention can be practiced without resorting to the details specifically set forth. In other instances, well-known processing materials, structures, and techniques have not been described in detail in order not to unnecessarily obscure the present invention.

Only the preferred embodiments of the present invention and but a few examples of its versatility are shown and described in the present invention. It is to be understood that the present invention is capable of use in various other embodiments and is susceptible of changes and/or modifications within the scope of the inventive concept as expressed herein.

What is claimed is:

1. A method of increasing the performance of a composite lubricant material when utilized as a thin film lubricant, which method comprises steps of:
    (a) providing a substrate including at least one surface;
    (b) providing a composite lubricant comprising a mixture of at least one perfluoropolyether compound and at least one phosphite or phosphate compound;
    (c) applying a thin layer or film of said composite lubricant to said at least one surface of said substrate; and
    (d) treating said thin layer or film of composite lubricant with UV radiation at a dosage and for an interval sufficient to
        reduce the surface tension of said thin layer or film of composite lubricant, as evidenced by an increase in the water contact angle ("WCA") thereof.

2. The method as in claim 1, wherein:
step (a) comprises providing a substrate in the form of a disk-shaped magnetic or magneto-optical ("MO") recording medium.

3. The method as in claim 2, wherein:
step (a) comprises providing a magnetic or MO recording medium wherein said at least one surface comprises a layer of a carbon (C)-based material.

4. The method as in claim 1, wherein:
step (b) comprises providing a composite lubricant comprising a 50/50 mixture of at least one perfluoropolyether compound and at least one phosphite compound.

5. The method as in claim 4, wherein:
step (b) comprises providing a composite lubricant comprising a mixture of:
    (i) at least one perfluoropolyether compound having a generally linear perfluoropolyether chain with a reactive group at at least one end of said chain; and
    (ii) at least one organophosphite or organophosphate compound comprised of at least one aromatic group bonded to a phosphorus atom via an oxygen atom.

6. The method as in claim 5, wherein:
step (b) comprises providing a composite lubricant in the form of a 50/50 mixture of said at least one perfluoropolyether compound and said at least one organophosphite or organophosphate compound.

7. The method as in claim 5, wherein:
step (b) comprises providing a composite lubricant wherein said at least one perfluoropolyether compound having a generally linear perfluoropolyether chain comprises a plurality of —($CxF2xO$)n- repeating units, wherein x in each unit is independently an integer from about 1 to about 10 and n is an integer from about 10 to about 30.

8. The method as in claim 7, wherein:
step (b) comprises providing a composite lubricant wherein said at least one reactive group at at least one end of said generally linear chain is selected from the group consisting of ester (—COOR), alcohol (—COH), carboxylic acid (—COOH), and carboxylic chloride (—COCl) groups.

9. The method as in claim 5, wherein:
step (b) comprises providing a composite lubricant wherein said at least one organophosphite or organophosphate compound is comprised of at least one substituted aromatic group.

10. The method as in claim 9, wherein:
step (b) comprises providing a composite lubricant comprising at least one organophosphite compound selected from the group consisting of tris (2,4 di-butylphenoxy) phosphite, tris (mono-fluorophenoxy) phosphite, and tris (mono-trifluoromethylphenoxy) phosphite.

11. The method as in claim 9, wherein:
step (b) comprises providing a composite lubricant comprising at least one organophosphate compound selected from the group consisting of tris (2,4 di-butylphenoxy) phosphate, tris (mono-fluorophenoxy) phosphate, and tris (mono-trifluoromethylphenoxy) phosphate.

12. The method as in claim 1, wherein:
step (c) comprises applying said thin layer or film of said composite lubricant at a thickness ranging from about 5 to about 40 Å.

13. The method as in claim 1, wherein:
step (d) comprises treating said thin layer or film of said composite lubricant with UV radiation from a source including wavelengths of 185 and 254 nm and providing an intensity between about 20 and about 35 mw/cm$^2$.

14. The method as in claim 13, wherein:
step (d) comprises treating said thin layer or film of said composite lubricant in an oxygen-free atmosphere with UV radiation for from about 20 sec. to about 2 min. at about 50° C.

15. The method as in claim 1, wherein:
said at least one surface comprises a material that ejects excited outer orbital electrons upon UV irradiation.

16. A data/information storage and retrieval medium with improved durability when utilized in "Contact Start/Stop" ("CSS") operation, comprising:

(a) a disk-shaped substrate including at least one surface, a layer stack formed on said at least one surface and including at least one magnetic or magneto-optical ("MO") recording layer and an uppermost, protective overcoat layer comprising a carbon (C)-based material; and (b) a lubricant topcoat layer on said protective overcoat layer, said lubricant topcoat layer formed by a process comprising steps of:
   (i) applying a thin layer or film of a composite lubricant material on said protective overcoat layer, said composite lubricant comprising a mixture of at least one perfluoropolyether compound and at least one phosphite or phosphate compound; and
   (ii) treating said thin layer or film of composite lubricant with UV radiation at a dosage and for an interval sufficient to
   reduce the surface tension of said thin layer or film of composite lubricant, as evidenced by an increase in the water contact angle ("WCA") thereof.

17. The medium according to claim 16, wherein said composite lubricant comprises a mixture of at least one perfluoropolyether compound having a generally linear perfluoropolyether chain with a reactive group at at least one end of said chain; and at least one organophosphite or organophosphate compound comprised of at least one aromatic group bonded to a phosphorus atom via an oxygen atom.

18. The medium according to claim 17, wherein said mixture comprises at least one perfluoropolyether compound having a generally linear perfluoropolyether chain with a reactive group at at least one end of said chain comprises a plurality of —($C_xF_{2x}O$)n- repeating units, wherein x in each unit is independently an integer from about 1 to about 10 and n is an integer from about 10 to about 30, and said at least one reactive group at at least one end of said generally linear chain is selected from the group consisting of ester (—COOR), alcohol (—COH), carboxylic acid (—COOH), and carboxylic chloride (—COCl) groups.

19. The medium according to claim 18, wherein said mixture comprises at least one organophosphite compound including at least one substituted aromatic group, selected from the group consisting of tris (2,4 di-butylphenoxy) phosphite, tris (mono-fluorophenoxy) phosphite, and tris (mono-trifluoromethylphenoxy) phosphite.

20. The medium according to claim 18, wherein said mixture comprises at least one organophosphate compound including at least one substituted aromatic group, selected from the group consisting of tris (2,4 di-butylphenoxy) phosphate, tris (mono-fluorophenoxy) phosphate, and tris (mono-trifluoromethylphenoxy) phosphate.

21. The medium according to claim 16, wherein said lubricant topcoat layer has a thickness ranging from about 5 to about 40 Å.

* * * * *